United States Patent
Beach et al.

(10) Patent No.: US 10,011,358 B2
(45) Date of Patent: Jul. 3, 2018

(54) TOILETS WITH IMPROVED REMOVABILITY FOR PASSENGER TRANSPORT VEHICLES

(71) Applicant: MAG Aerospace Industries, LLC, Carson, CA (US)

(72) Inventors: David A. Beach, Seal Beach, CA (US); Robert G. Ratliff, Buena Park, CA (US); Howard C. B. Kuhns, Long Beach, CA (US)

(73) Assignee: MAG Aerospace Industries, LLC, Carson, CA (US)

(*) Notice: Subject to any disclaimer, the term of this patent is extended or adjusted under 35 U.S.C. 154(b) by 0 days.

(21) Appl. No.: 15/163,923

(22) Filed: May 25, 2016

(65) Prior Publication Data

US 2016/0264245 A1    Sep. 15, 2016

Related U.S. Application Data

(63) Continuation of application No. 14/168,247, filed on Jan. 30, 2014, now Pat. No. 9,371,136.

(60) Provisional application No. 61/758,483, filed on Jan. 30, 2013.

(51) Int. Cl.
| | | |
|---|---|---|
| *E03D 11/10* | (2006.01) | |
| *B64D 11/02* | (2006.01) | |
| *E03D 11/17* | (2006.01) | |
| *E03D 5/00* | (2006.01) | |
| *E03F 1/00* | (2006.01) | |
| *E03D 11/02* | (2006.01) | |

(52) U.S. Cl.
CPC ............... *B64D 11/02* (2013.01); *E03D 5/00* (2013.01); *E03D 11/02* (2013.01); *E03D 11/17* (2013.01); *E03F 1/006* (2013.01); *E03D 2201/40* (2013.01); *Y02T 50/46* (2013.01)

(58) Field of Classification Search
CPC ........... B64D 11/02; E03D 11/02; E03F 1/006
USPC ........................................................ 4/435
See application file for complete search history.

(56) References Cited

U.S. PATENT DOCUMENTS

| | | |
|---|---|---|
| 4,905,325 A | 3/1990 | Colditz |
| 5,271,105 A | 12/1993 | Tyler |
| 6,353,942 B1 | 3/2002 | Pondelick et al. |
| 6,536,054 B2 | 3/2003 | Anderson et al. |

(Continued)

FOREIGN PATENT DOCUMENTS

| | | |
|---|---|---|
| CA | 2897487 | 8/2014 |
| DE | 4201986 | 4/1993 |

(Continued)

OTHER PUBLICATIONS

International Search Report and Written Opinion, PCT/US2014/013761, dated May 2, 2014, 12 pages.

(Continued)

*Primary Examiner* — Christine Skubinna
(74) *Attorney, Agent, or Firm* — Kilpatrick Townsend & Stockton LLP; Dean W. Russell; Kristin M. Crall (57) ABSTRACT

Embodiments described herein relate to quick release toilet concepts, which can be useful particularly on-board aircraft and other passenger transport vehicles. Further specific embodiments relate to a quick release rinse valve, a quick release flush valve, an integrated rinse ring, a replaceable toilet bowl, an integrated anti-siphon/rinse valve, and improved flush valve performance.

9 Claims, 11 Drawing Sheets

(56) References Cited

U.S. PATENT DOCUMENTS

| | | | |
|---|---|---|---|
| 6,536,055 B2* | 3/2003 | Pondelick | E03D 11/02 |
| | | | 137/588 |
| 8,291,525 B2 | 10/2012 | Pondelick et al. | |
| 9,371,136 B2 | 6/2016 | Beach et al. | |
| 2001/0034902 A1 | 11/2001 | Tyler | |
| 2002/0131822 A1 | 9/2002 | Hill et al. | |
| 2004/0164550 A1 | 8/2004 | Knowles et al. | |
| 2008/0265092 A1 | 10/2008 | Cooper et al. | |
| 2010/0083433 A1* | 4/2010 | Pondelick | B64D 11/02 |
| | | | 4/316 |
| 2014/0208498 A1 | 7/2014 | Beach et al. | |

FOREIGN PATENT DOCUMENTS

| | | |
|---|---|---|
| DE | 202004019425 | 4/2005 |
| EP | 2951089 | 12/2015 |
| GB | 2248858 | 4/1992 |
| WO | 2014120878 | 8/2014 |

OTHER PUBLICATIONS

Non Final Office Action, U.S. Appl. No. 14/168,247, dated Aug. 12, 2015, 9 pages.
International Preliminary Report on Patentability, PCT/US2014/013761, dated Aug. 13, 2015, 8 pages.
Final Office Action, U.S. Appl. No. 14/168,247, dated Jan. 29, 2016, 9 pages.
Notice of Allowance, U.S. Appl. No. 14/168,247, dated Mar. 3, 2016, 7 pages.
Communication Pursuant to Article 94(3) EPC, EP Application No. 14705251.8, dated Feb. 23, 2017, 4 pages.

* cited by examiner

TOILETS WITH IMPROVED REMOVABILITY FOR PASSENGER TRANSPORT VEHICLES

CROSS REFERENCE TO RELATED APPLICATIONS

This application is a continuation of U.S. patent application Ser. No. 14/168,247, filed Jan. 30, 2014, titled "Toilets With Improved Removability For Passenger Transport Vehicles," which claims the benefit of U.S. Provisional Application Ser. No. 61/758,483, filed Jan. 30, 2013, titled "Toilet Concept," the entire contents of each of which are hereby incorporated by reference.

FIELD OF THE INVENTION

Embodiments described herein relate to toilet concepts for improved removability of one or more components of the toilet system, which can be particularly useful on-board aircraft and other passenger transport vehicles. Further specific embodiments relate to a quick release rinse valve, a quick release flush valve, an integrated rinse ring, a replaceable toilet bowl, an integrated anti-siphon/rinse valve, and improved flush valve performance.

BACKGROUND

Many types of passenger transport vehicles (such as aircraft, ships, buses, trains, and any other passenger transport vehicles) use vacuum toilets. A vacuum toilet system typically has a bowl for receiving waste with an outlet that is connected to a vacuum sewer line, which leads to a collection tank placed under at least partial vacuum by a vacuum source. A discharge valve between the bowl outlet and the vacuum sewer line controls and allows fluid communication therebetween. When the discharge valve is opened, waste in the bowl is transported through the sewer line to the collection tank via a pressure differential. Vacuum toilets also use a source of rinse fluid delivered by a rinse fluid ring or dispenser and valve for introducing rinse fluid into the bowl. The discharge flush valve, rinse valve, toilet frame, and toilet bowl are typically provided together as an integral designed unit.

However, toilets for use on-board passenger transport vehicles generally experience a very high service frequency, as there are typically only a few toilets provided that are intended to service hundreds of passengers. Existing toilets in the field are subject to scratches from routine cleaning, which damages and wears the non-stick coating on the toilet bowl. In order to restore the non-stick coating, the airline typically has to remove the entire toilet system (including the rinse ring, rinse valve, flush valve, valve sealing point, anti-siphon valve/vacuum breaker, and other components) from the aircraft in order to remove and replace just the toilet bowl portion of the system. Thus, improvements for removing and replacing vacuum toilets, as well as their components, are provided herein.

BRIEF SUMMARY

Certain embodiments described herein provide quick release features for toilets and their related components. These quick release features find particular use in connection with vacuum toilets, which may need to have various components of the toilet replaced more often than typical residential or other commercial toilets. In addition, maintenance on-board aircraft and other vehicles can be particularly expensive in view of the downtime and lost revenue due to reduced travel time of the vehicle. Accordingly, increased flexibility for replacing worn or damaged parts is a critical improvement to vehicle toilet systems. Nonetheless, although the embodiments described herein find particular use on-board passenger transport vehicles and the embodiments may be described with specific reference to aircraft toilet systems, it should be understood that the features may be translated to other industries if appropriate.

DETAILED DESCRIPTION

Embodiments of the present invention provide systems and devices for quickly disconnecting toilets and certain related toilet components. For example, aircraft toilets and their various components may need to be easily disconnected from the lavatory space for maintenance or replacement. Rather than requiring multiple bolts or screws that must be individually removed, the present disclosure seeks to provide improved toilets and various components with quick release functionality.

In one aspect, the toilet systems described herein allow for the toilet bowl to be replaced on-board the aircraft, without having to remove the entire toilet system. The replaceable toilet bowl is secured in place by the structural frame of the toilet system, such that the toilet bowl does not support structural load from the toilet shroud if a passenger sits on the toilet. This allows the toilet bowl to be manufactured from a more economical material, such as various non-metallic materials. Further, both the toilet bowl and the rinse assembly may be bypassed from the load path by the frame structure, allowing the rinse components to be made of more economical materials as well. The replaceable systems described also allow removal and replacement of one or more portions of the rinse ring system and/or the flush valve system. The integrated structures described provide load transfer from the rinse ring to the floor attachment through the structure. Additionally, quick release of the toilets and/or the related component equipment may be achieved in a reliable and robust manner.

Figure 1:
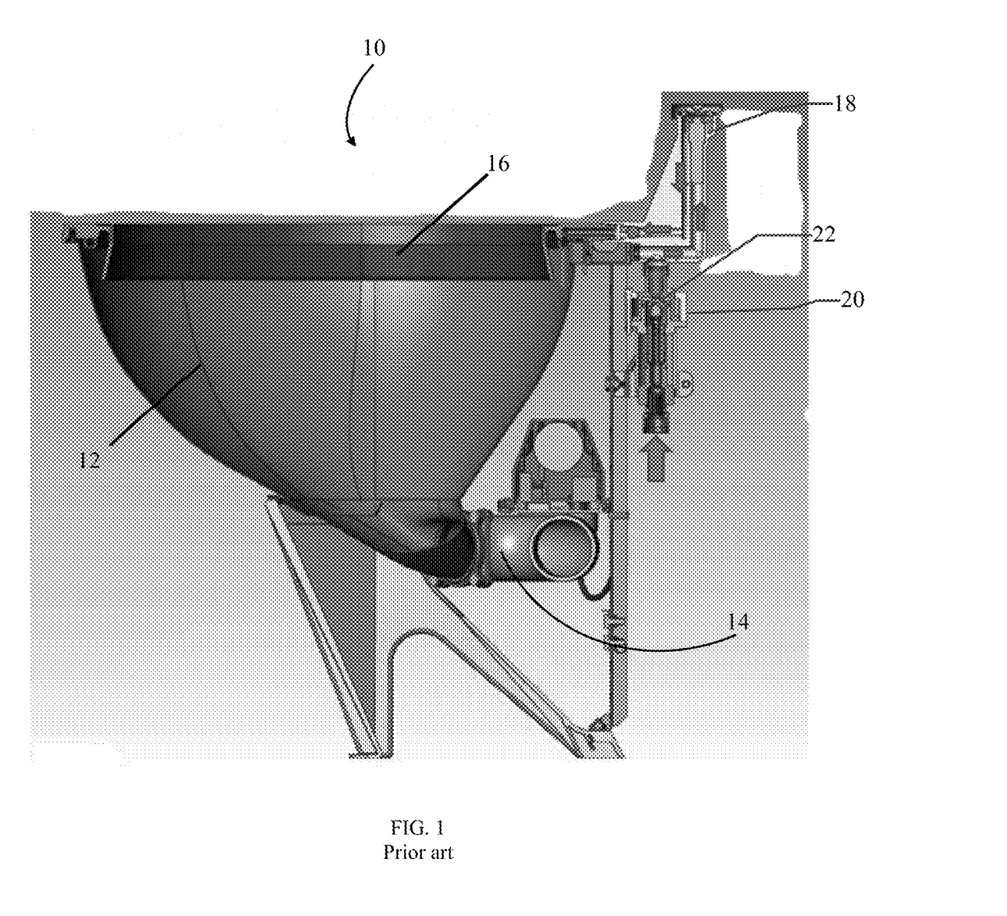
FIG. 1 shows a side view of a prior art toilet system.

In order to provide a comparison of the new design to existing toilet systems, FIG. 1 shows one example of a prior art toilet system 10. This system 10 includes a toilet bowl 12 that is integrated with a discharge valve 14, a rinse ring 16, an anti-siphon valve/vacuum breaker 18, and a rinse valve 20. The water flow path is shown by the arrows, and shows water flowing from a water source into the rinse valve 20, past a valve sealing point 22, and to the vacuum breaker 18. The vacuum breaker 18 prevents the water from being siphoned backward into the water source. Once past the vacuum breaker 18, the water is delivered into the toilet bowl 12 for flushing via the rinse ring 16. Waste is drawn out of the toilet bowl 12 through the discharge valve 14 and delivered to a collection tank. One of the disadvantages of this traditional system 10 is that if the toilet bowl 12 becomes scratched or damaged or otherwise needs to be replaced, the entire valving system also needs to be removed.

Figure 2:
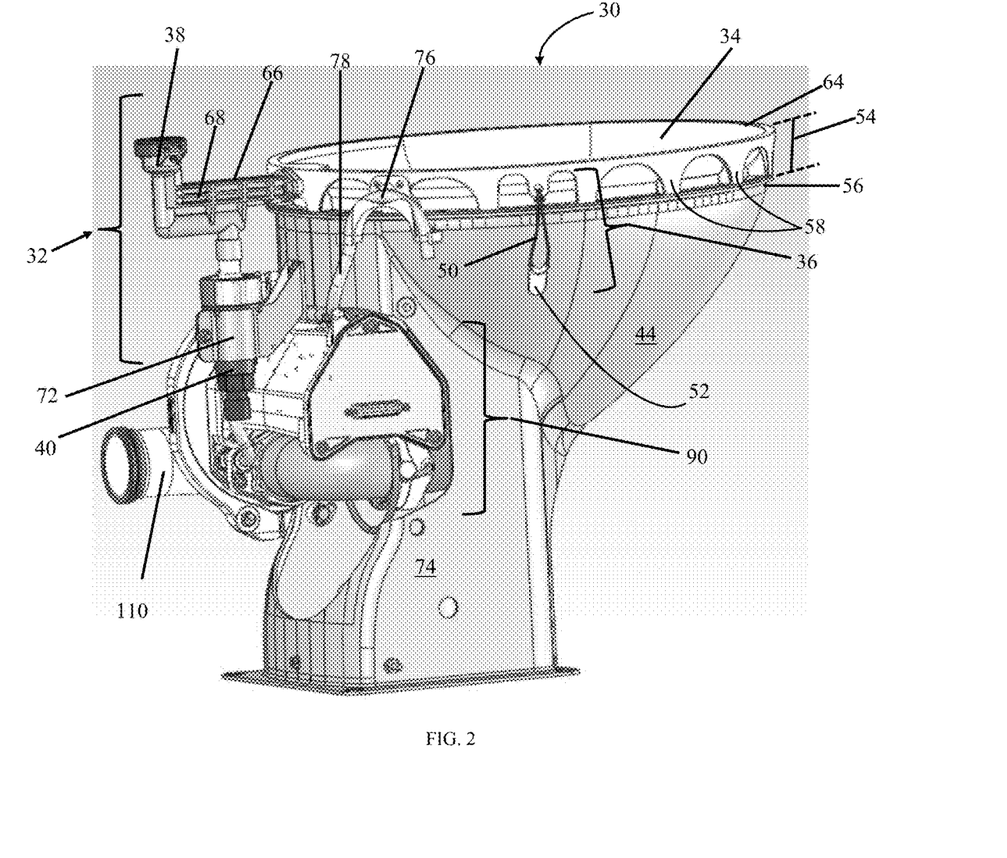
FIG. 2 shows a side perspective view of one embodiment of a toilet system having improved removability of various components.
Figure 3:
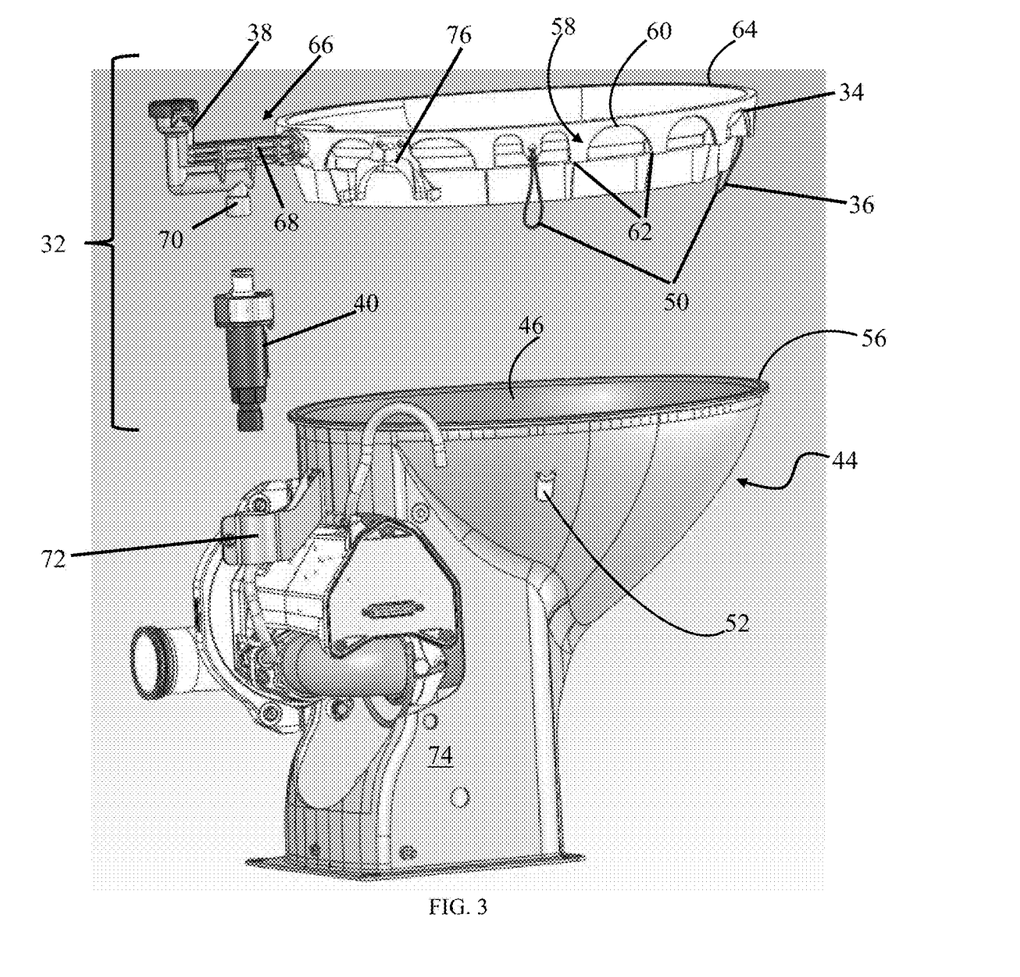
FIG. 3 shows a side perspective view of the toilet system of FIG. 2 with the rinse ring removed.

Referring now to FIGS. 2-8, there is provided an improved toilet system 30 that has a quick release rinse ring and valve system 32. The toilet system 30 may also have a quick release flush valve system 90. As shown in FIG. 3, the quick release rinse ring and valve system 32 includes a quick release rinse ring 34, a securement system 36, an anti-siphon valve 38, and a rinse valve 40. The figures show the system 32 as generally being securable to and removable from an upper surface 56 of a toilet frame 44.

Referring now to FIGS. 5-8, the quick release flush valve system 90 includes a flush valve body 92, a quick connection feature 94 with an actuation handle 96, and one or more fasteners 98.

Quick Release Rinse Ring and Valve System

Referring first and more specifically to the quick release rinse ring and valve system 32, FIG. 2 shows a rinse ring 34 of the system 32 in position on the toilet frame 44, and FIG. 3 shows the rinse ring 34 removed from the toilet frame 44. The rinse ring 34 is designed to be a separate component from the toilet frame 44 and removable therefrom. The rinse ring 34 has a generally round body that is similar in shape to the toilet opening 46 of the toilet frame 44. The rinse ring 34 also features a securement system 36. In one embodiment, the securement system may comprise securement bands 50 that extend from the sides of the rinse ring 34. Securement bands 50 may be elastic or elastomeric, such that they stretch to cooperate with securement protrusions 52 on the toilet frame 44, as shown in FIG. 2. One benefit of the securement system shown and described is that it can be used without requiring extra tools. A user can simply extend the bands 50 over the protrusions 52. It should be understood that other quick release options may be possible and are considered within the scope of this invention, such as a dove tail and slot configuration, a snap configuration, a hinged configuration (as described below), as well as other possibilities.

It should be understood that the locations of the securement bands 50 and protrusions 52 may be changed, such that the protrusions 52 are on the rinse ring 34 and the bands 50 are on the toilet frame 44. The bands 50 and protrusions 52 should be spaced so that they provide a secure attachment between the rinse ring 34 and the toilet frame 44 around the entirety of the rinse ring 34. For example, three or four bands 50/protrusion 52 may be used to make up the entire securement system 36.

Figure 11:
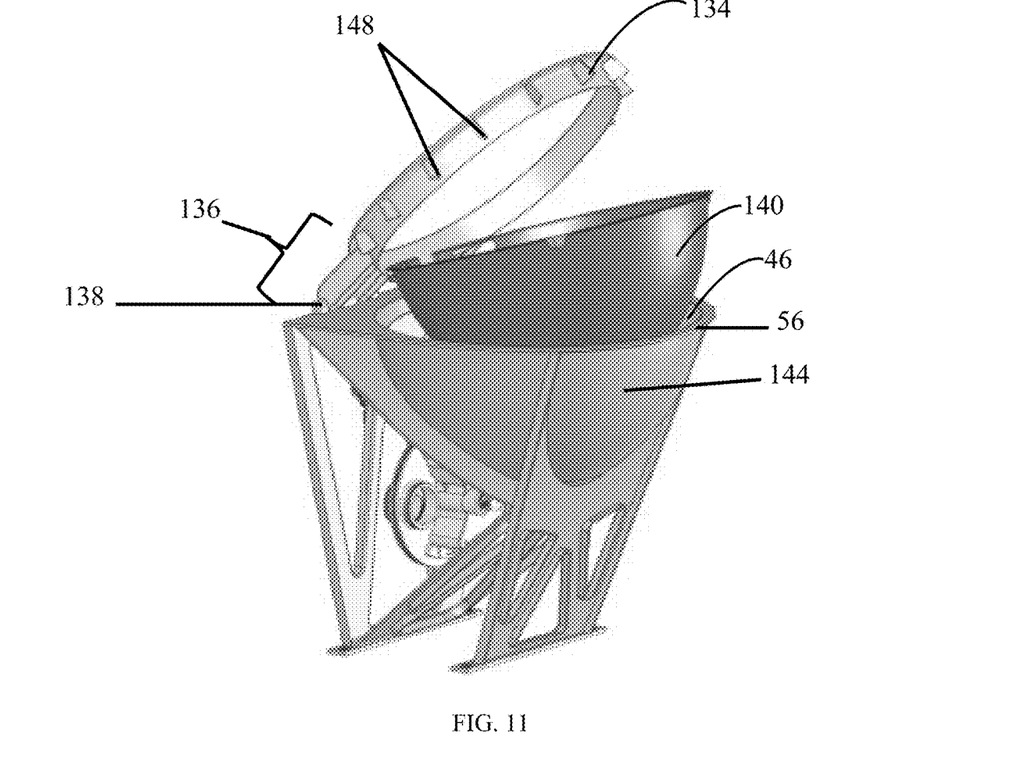
FIG. 11 shows a side perspective view of an alternate embodiment of a removable rinse ring with the rinse ring in an upwardly hinged position.
Figure 12:
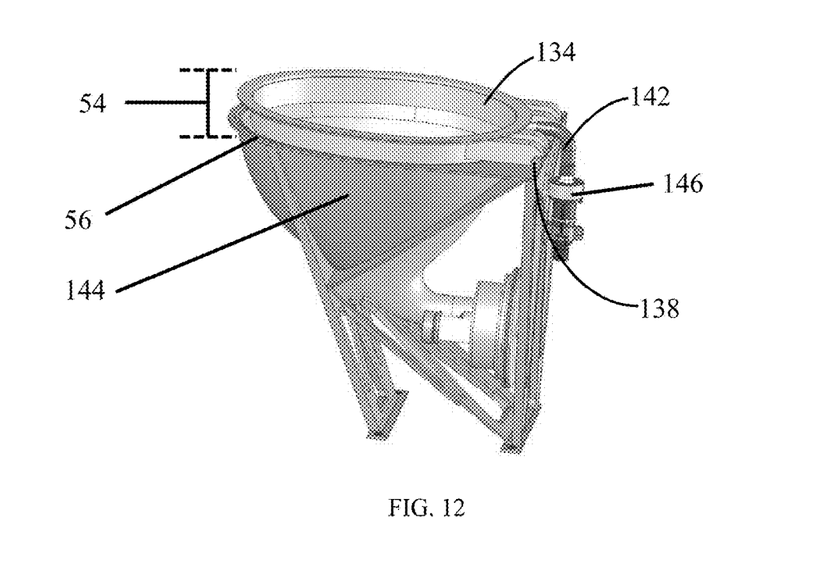
FIG. 12 shows a side view of the embodiment of FIG. 11 with the rinse ring in a lowered position.

As discussed above, it should also be understood that other securement options are available and considered within the scope of this disclosure. For example, as shown in FIGS. 11 and 12, an alternate rinse ring 134 may be designed to articulate away from the toilet frame 144, but to remain secured thereto via an alternate securement system 136. This securement system 136 may be provided via a hinge 138 positioned at the rear of the rinse ring 134 on the toilet frame 144. Such a hinge 138 (or similar attachment mechanism) may be hooked or keyed, such as with a partial hinge, to provide for more ready disassembly of rinse assembly 134. This assist to attain further modularity and/or access. In use, the rinse ring 134 may be rotated up in order to allow the toilet bowl component 140 to be removed. This embodiment may also provide tubing 142 that connects the rinse ring 134 to the rinse valve 146, which acts to control water flow.

In any of the options provided, the rinse ring 34, 134 should generally be spaced a distance 54 from the upper surface 56 of the toilet frame opening 46. The Department of Public Health requires such a distance, and in many instances, the distance should be one inch or greater. The distance is generally provided in order to create a physical separation and prevent cross contamination that may otherwise occur between the fresh rinse water and the flood plane of the toilet (defined as the upper part of the toilet bowl, to which waste may rise in the event of a back-up that could cause waste to reach the top of the toilet bowl). Providing the rinse ring 34, 134 at a position separated from the flood plane prevents any waste back up from contacting the rinse ring and possibly entering the potable water system. This separation distance is shown as a vertical distance in FIGS. 11, 12 and 2, 4, but it be a horizontal distance as shown in FIG. 13, described below.

As shown in FIGS. 11 and 12, this distance 54 may be achieved by a series of feet 148 that extend the general circumference of the rinse ring 134. When the rinse ring 134 is positioned to rest against the upper surface 56 toilet frame opening 46, the feet 148 abut the opening 46 in order to keep the required space 54 between the fresh water inlet and any overflow waste at the flood plane.

Figure 13:
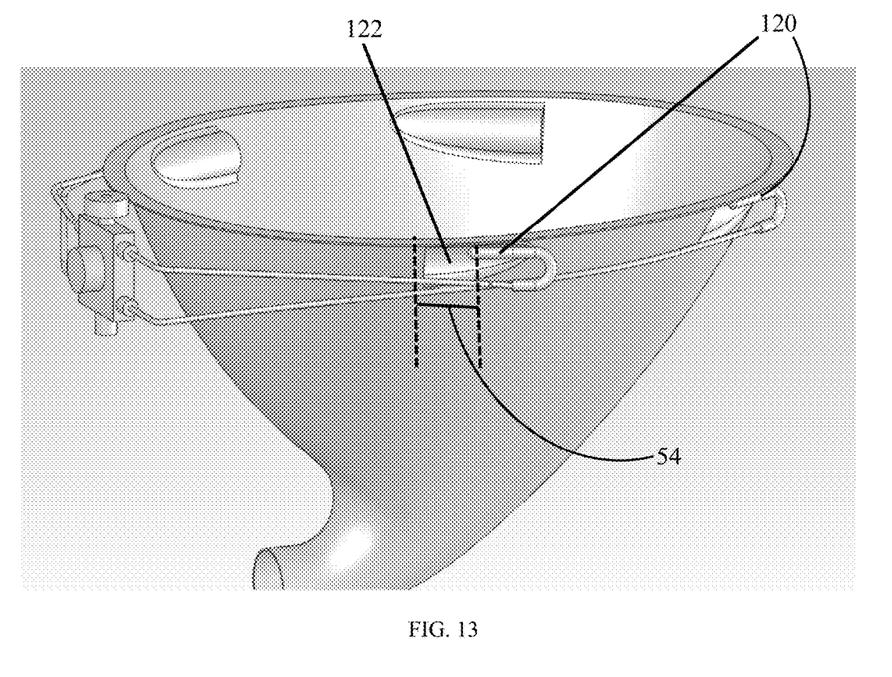
FIG. 13 shows a side view of an alternate embodiment for creating a distance between a rinse nozzle of a rinse ring and a flood plane of a toilet system.

As shown in the alternate embodiment of FIG. 13, this separation may be done horizontally. In this option, a series of rinse ring nozzles 120 are positioned a horizontal distance 54 from each the flood plane openings 122, along an outer surface of the toilet bowl. In this option, the water delivered into the rinse ring exits the nozzles 120 and enters the toilet bowl through the opening 122. However, the openings 122 are scalloped, such that any waste overflow will drain out of the opening, away from the nozzle 120.

Figure 4:
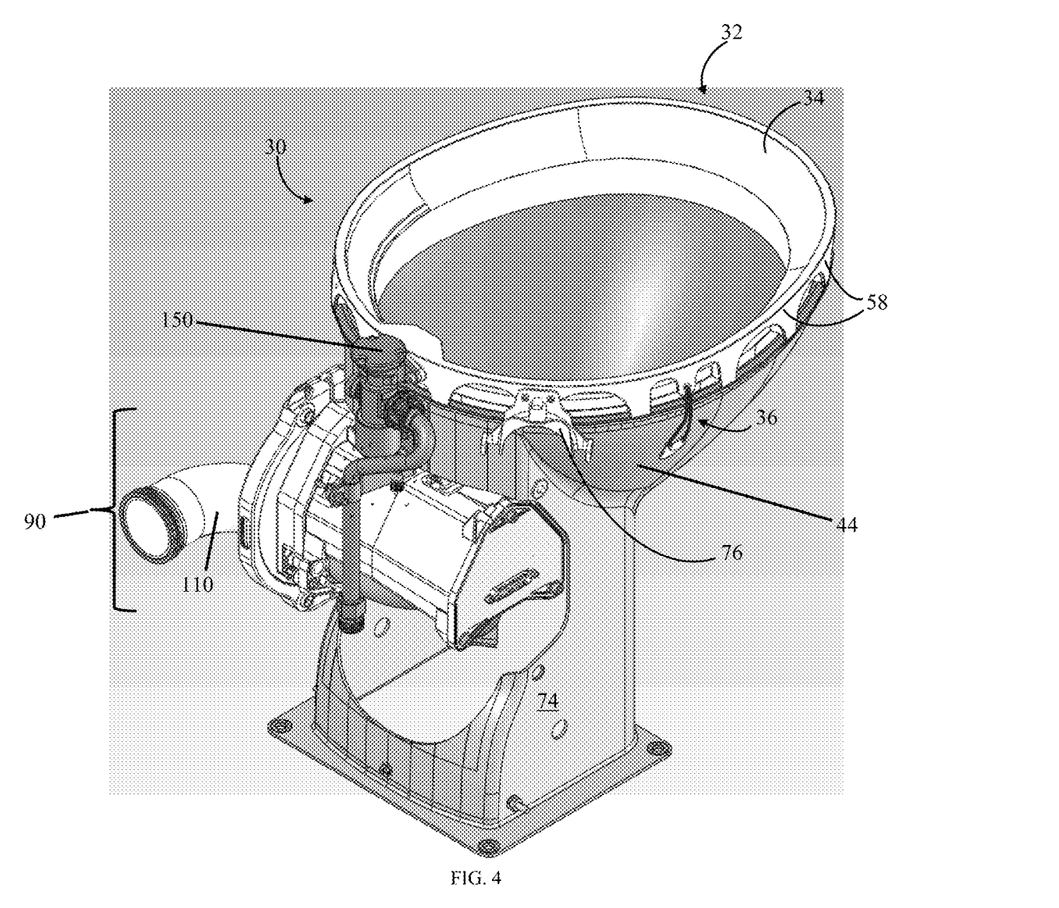
FIG. 4 shows a top perspective view of an alternate embodiment of a toilet system.

As shown in FIGS. 2-4, this distance 54 may instead be achieved by a series of ledge features 58 that are positioned along the outer edge of the rinse ring 34. As shown in FIG. 3, ledge features 58 are shown as being a series of curvatures 60 with end feet 62 that extend about half-way down the rinse ring 34. When the rinse ring 34 is positioned on the toilet frame 44, the feet 62 of the ledge features 58 abut the toilet frame 44 and create the desired distance 54 between the upper surface 56 of the frame 44 and the upper surface 64 of the rinse ring 34. As discussed, this physical, one inch separation is required for cross connection prevention, as well as for human safety. The space behind the ledge features 58 creates an air gap. Providing an air gap as a part of the rinse ring 34 provides a controlled air inlet for flushing and for human safety (in the event that a flush occurs while a passenger is sitting on the toilet). (Similar air gaps are also provided for the other embodiments described herein.) Such air gaps are also outlined and described in co-pending U.S. application Ser. No. 14/085,976, titled "Toilet Concepts" and filed on Nov. 21, 2013.

Referring now to other features of the quick release rinse ring and valve system 32, FIGS. 2 and 3 show a valve attachment 66 that extends from a rear portion of the rinse ring 34. The valve attachment 66 includes a stem 68 that supports an anti-siphon valve 38. The valve attachment 66 also has a lower outlet 70 that cooperates with a rinse valve 40. The rinse valve 40 is cradled by a bracket 72 at the rear of the pedestal 74 of the toilet frame 44. The bracket 72 supports the rinse valve 40 and causes the rinse valve 40 to be sandwiched between the bracket 72 and the lower outlet 70 of the valve attachment 66. Retention of the rinse ring 34 also keeps the rinse valve 40 in place. For example, when the rinse ring 34 is secured with respect to the toilet frame 44 with the rinse valve 40 positioned between the lower outlet 70 and the bracket 72, the securement system 36 maintains both the rinse ring 34 and the rinse valve 40 in place and attached to the toilet frame 44. The rinse valve 40 is sandwiched between the bracket 72 and the rinse ring 34.

The rinse ring 34 may also have a tube receiving bracket 76, which can be seen in more detail in FIG. 4. This bracket 76 is designed to receive air inlet tube 78 of the discharge flush valve 90, as shown in FIG. 2. This optional feature can assist with the proper alignment of the rinse ring 34 with respect to the toilet frame 44.

Quick Release Flush Valve System

FIGS. 4-8 show embodiments of a quick release flush valve system 90. This feature may be used in connection with the above-described quick release ring and valve system 32 (as shown in the figures), or it may be provided as a separate feature. On existing toilets, the flush valve is either a part of the toilet structure or mounted by multiple screws, which requires physically removing the toilet from the aircraft or other vehicle installation before the flush valve may be removed from the toilet. The design described herein provides a quick release flush valve system 90 to increase maintainability of the toilet. This feature allows for a quick release of the flush valve 90 in the event that a failure would occur. The quick release flush valve system 90 can be removed from the toilet pedestal 74 while the toilet frame 44 stays installed. (The shroud that covers the entire assembled toilet will simply need to be removed first.)

Figure 5:
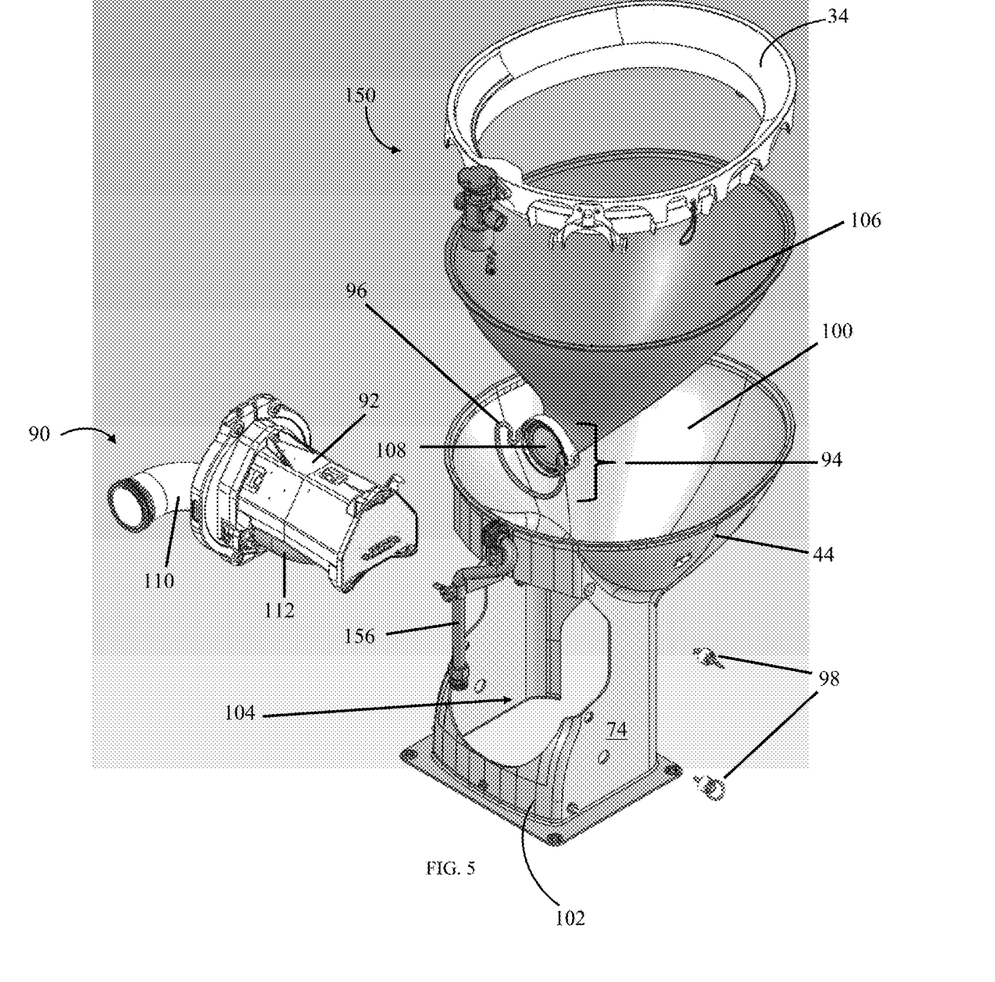
FIG. 5 shows an exploded view of a removable rinse ring with an integrated rinse valve/anti-siphon valve and a removable flush valve system.
Figure 6:
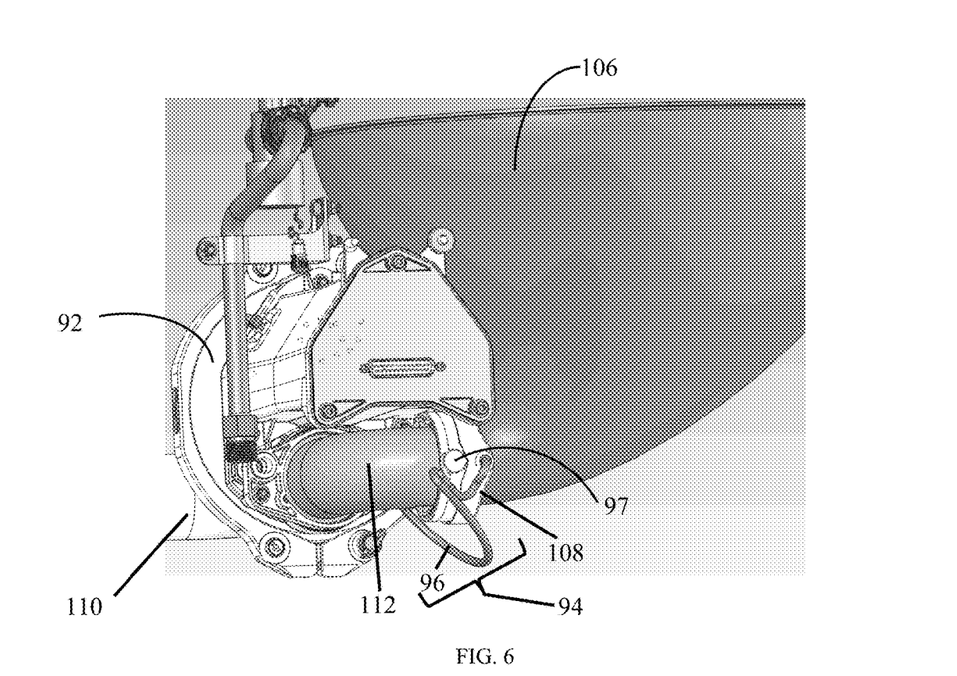
FIG. 6 shows a side perspective view of one embodiment of a quick connection feature that may be used to secure a removable flush valve body to a toilet waste outlet, with the quick connection feature in an open position.

FIG. 5 shows the flush valve body 92 removed from the toilet frame pedestal 74. More specifically, the toilet frame 44 generally provides a toilet bowl receiving portion 100, a base 102 portion, and a flush body receiving opening 104. A removable toilet bowl 106 with a waste outlet 108 can be received in the toilet bowl receiving portion 100, such that the waste outlet 108 is accessible through the flush body receiving opening 104. FIG. 6 shows the removable toilet bowl 106 and the removable flush valve body 92 in place. As shown, the flush valve body 92 has two connection arms. One connection arm is a vacuum waste system connection arm 110, and the other arm is a toilet bowl outlet connection arm 112.

Figure 7:
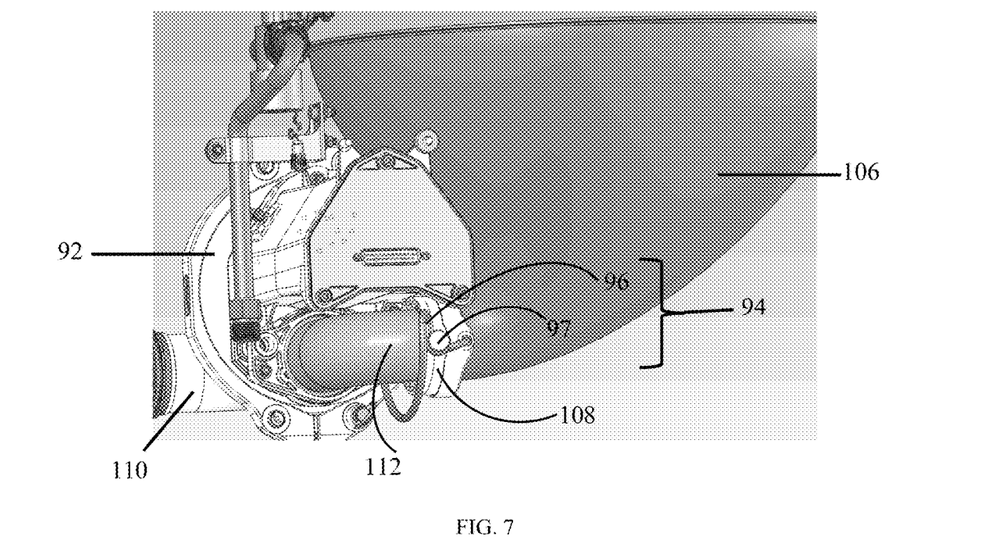
FIG. 7 shows a side perspective view of the quick connection feature of FIG. 6 with the quick connection feature in a closed position.
Figure 8:
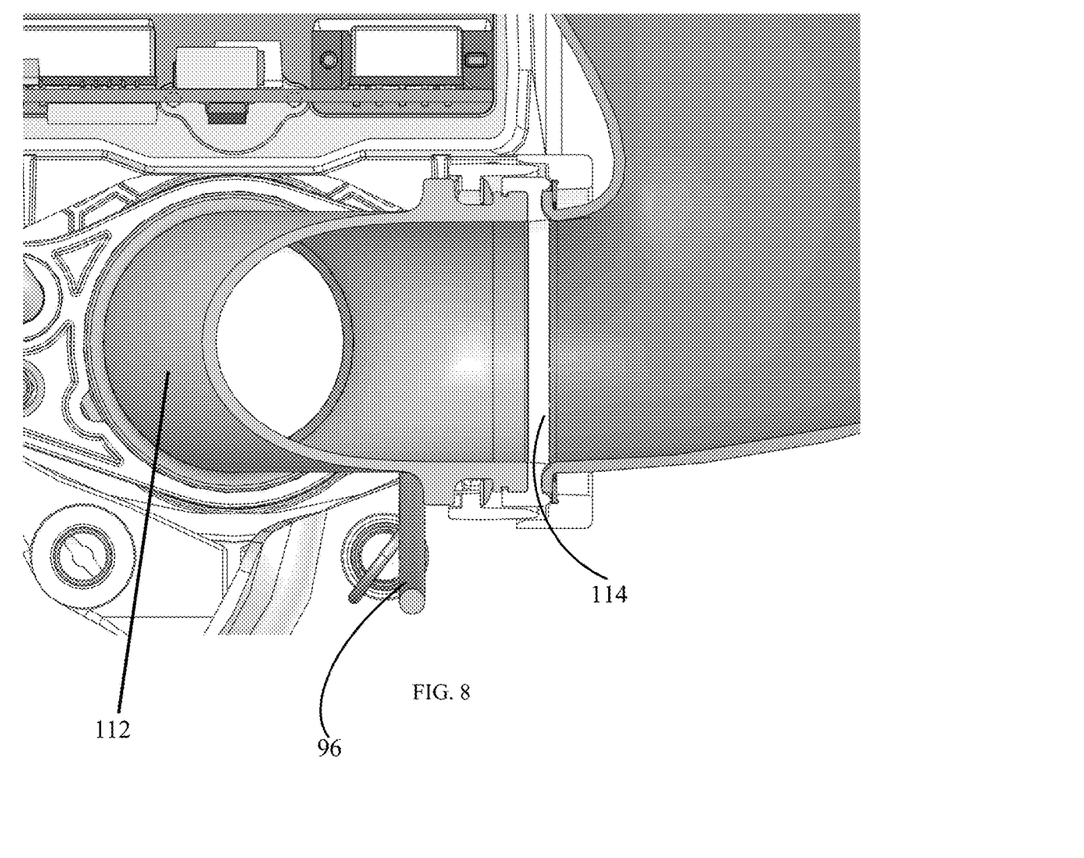
FIG. 8 shows a side cross sectional view of the quick connection feature of FIG. 7.

FIG. 6 shows the toilet bowl connection arm 112 as it is being connected to the toilet bowl waste outlet 108. The waste outlet 108 has a quick connection feature 94, which includes an actuation handle 96 and securement pin 97. FIG. 6 shows the actuation handle 96 in an open position, as it is used to draw the toilet bowl connection arm 112 and the waste outlet 108 to one another. FIG. 7 shows the actuation handle 96 in a closed position, pinched against the securement pin 97. In this position, a seal 114 therebetween is compressed in order to prevent any leakage of fluid, such as liquid or air. FIG. 8 shows a side-view, illustrating the seal 114 as it is compressed by the actuation handle 96, between the arm 112 and the outlet 108. When the actuation handle 96 is released, the compression on the seal 114 is released, and the flush valve body 92 may be removed from the toilet frame/pedestal 74, as shown in FIG. 5.

The figures show the actuation handle 96 positioned near the end of the toilet bowl waste outlet 108. The securement pin 97 may be positioned on the connection arm 112 of the flush valve body 92, such that an elbow of the actuation handle 96 secures against and locks with respect to the pin 97. It should be understood, however, that the actuation handle may be positioned on the flush valve body 92 and the securement pin 97 may be positioned at the toilet bowl outlet 108.

Replaceable Toilet Bowl

Use of the two described systems 32 and 90 (the quick release ring and valve system 32 and the quick release flush valve system 90) together, allows for use of a removable toilet bowl 106. For example, the rinse ring 34 may be removed, as shown in FIGS. 3 and 5, and the flush valve body 92 may also be removed, as shown in FIG. 5. Removal of both components allow removal of the removable toilet bowl 106. This can allow the toilet bowl 106 to be easily removed and replaced without removing the entire toilet frame 44. This can be beneficial because toilet bowls can become scratched, the protective coating can become worn, or it may be desirable to switch a particular toilet bowl for a lighter toilet bowl of a different material (e.g., a non-metallic bowl) for added weight and cost savings.

Referring back to FIG. 2, once the system is in an assembled configuration, the vacuum waste system connection arm 110 of the flush valve system 90 may be secured to the vehicle's vacuum waste system. One example of such a connection is shown and described in co-pending U.S. application Ser. No. 14/085,976, titled "Toilet Concepts" and filed on Nov. 21, 2013.

If a component of the rinse and valve system 32 needs to be replaced, the rinse ring 34 may be removed as shown in FIG. 3. The user would unsecure the securement system 36. (Note that a final shroud will be positioned over the completed toilet assembly and bolted or otherwise secured to the floor in order to cover the quick release components. This adds a cleaner look to the toilet, and it also prevents any unintended tampering with the quick release features.) If, instead, a component of the flush valve system 90 needs to be replaced, the flush valve body 92 may be removed as shown in FIG. 5. The user would unsecure the actuation handle 96 and then turn the one or more fasteners 98 a quarter turn. (Fasteners are generally provided as ¼ turn fasteners to allow the flush valve to be removed and replaced quickly.) It the entire toilet bowl 106 is to be replaced, the rinse ring 34 and the flush valve body 90 may both be removed as shown in FIG. 5.

Integrated Rinse Ring

As shown in FIGS. 2 and 3, the anti-siphon valve 38 may be secured to or otherwise integrally formed with the rinse ring 34, such that removal of the rinse ring 34 also causes removal of the anti-siphon valve 38. The valve 38 may be integrally formed with the rinse ring 34 or it may be a separate component that is screwed onto the rear of the rinse ring 34.

In an alternate embodiment, the rinse ring 134 may be integrated into the toilet frame 144, as shown in FIGS. 11 and 12. In this embodiment, the rinse ring 134 is hinged to the toilet frame pedestal and does not require removal therefrom.

Integrated Anti-Siphon/Rinse Valve

Figure 9:
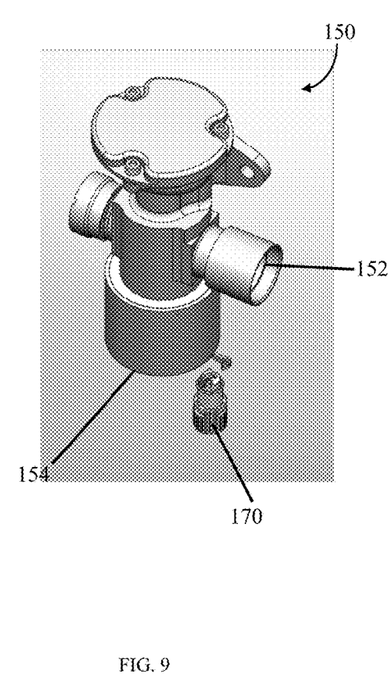
FIG. 9 shows a perspective view of one embodiment of an integrated rinse valve/anti-siphon valve.
Figure 10:
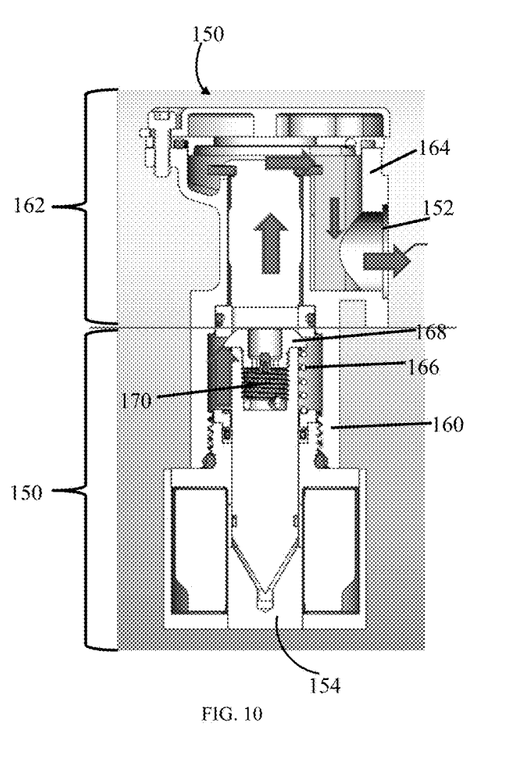
FIG. 10 shows a side cross-sectional view of the integrated valve of FIG. 9.

In the embodiments shown in FIGS. 2 and 3, the anti-siphon valve 38 is positioned on the rinse ring 34, and the rinse valve 40 is provided as a separate feature. In an alternate embodiment, the rinse valve and the anti-siphon valve may be integrated into a single integrated valve 150. An example of an integrated valve 150 in use is shown in FIGS. 4 and 5. Examples of a perspective view and cross-sectional view of an integrated valve 150 are shown in FIGS. 9 and 10. One benefit of this design is that movement of the rinse ring does not require a break into the potable water system, due to the collective movement of the rinse valve and the anti-siphon valve. Once the break from the potable water (or other rinse water) system has been made, the rinse ring can be disengaged is one step, along with the integrated valve 150.

As shown in FIGS. 4 and 5, the integrated valve 150 may be positioned at a rear portion of the rinse ring 34. It has a first connection point 152 that allows it to be in fluid cooperation with the rinse ring 34. The valve 150 also has a second connection point 154, which allows it to be in fluid cooperation with tubing 156 that leads to a water source. The water source may be the potable water source of the aircraft or vehicle, or it may direct cleaned grey water that is to be re-used for toilet flushing purposes. Examples of systems for grey water re-use that can be used with the systems described herein are described in co-pending U.S. Publication No. 2013/0305444 titled "Two-Stage Flush and Grey Water Flush Systems and Devices;" in U.S. application Ser. No. 13/942,856, titled "Systems and Methods for Treating Grey Water On-Board Passenger Transport Vehicles," filed on Jul. 16, 2013; and in co-pending U.S. application Ser. No. 14/081,089 titled "Mixed Fluid Filtration System," filed on Nov. 15, 2013. Whichever form of rinsing water that is to be delivered to the integrated valve 150, it generally enters the valve through tubing 156 via the second connection point 156.

Referring now to the integrated valve 150 cross-sectional view of FIG. 10, the valve 150 has a lower portion 158 that constitutes the rinse valve 160 and an upper portion 162 that constitutes the anti-siphon valve 164. The rinse valve 160 has an outer spring element 166 that abuts a valve head 168 in order cause movement of the valve stem 170.

The anti-siphon valve 164 portion abuts the valve head 168 portion. The anti-siphon valve 164 acts to prevent the rinse fluid that is delivered through the rinse valve from re-entering the line. It functions as a backflow device to keep any possibly contaminated water from draining back into the rinse valve (and thus, the water lines and/or water source). The arrows in FIG. 10 show the flow of water. Water is delivered through the rinse valve 160 into the body of the anti-siphon valve 164 and out through the first connection point 152 of the valve 150.

Improved Flush Valve Performance

Figure 14:
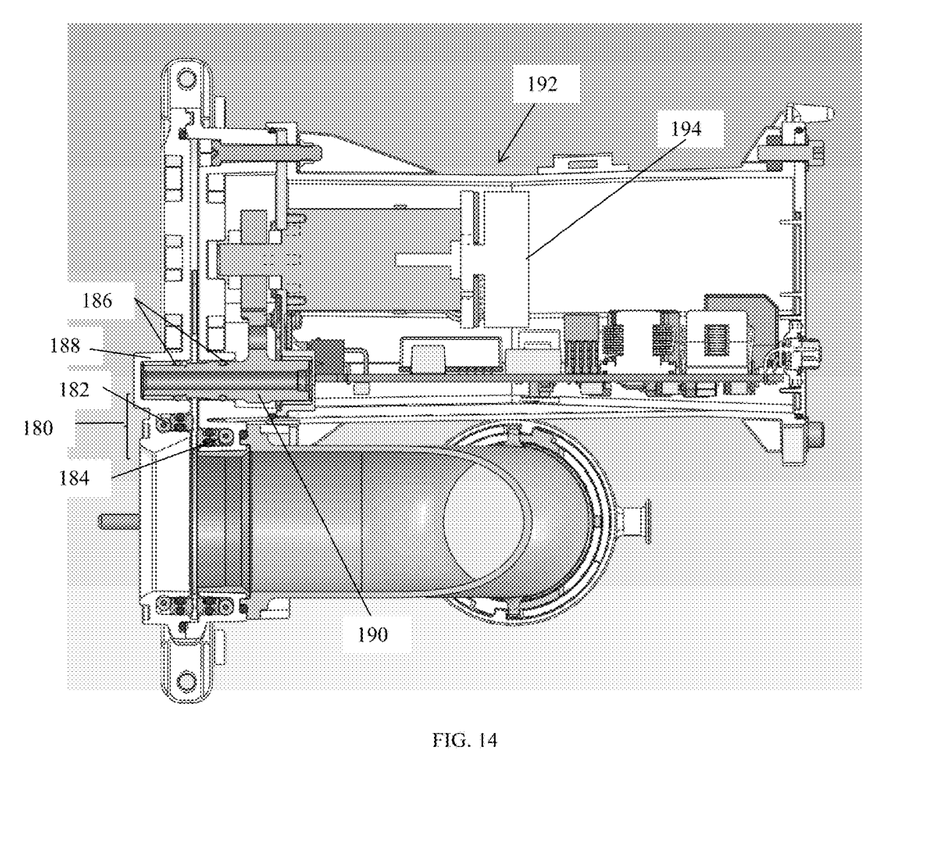
FIG. 14 is a side cross-sectional view of one embodiment of an improved flush valve.

The flush valve body 92 itself may also be designed for improved performance. Examples of some of the flush valve improvements that may be incorporated into the systems described herein are provided in U.S. Application Ser. No. 61/902,906 titled "Offset Seal Concept," filed on Nov. 12, 2013. For example, the seal of the flush valve may be provided as an offset seal design 180, as shown in FIG. 14. A first seal 182 may be offset from a second seal. This leading edge technology helps reduce waste migration into the flush valve housing.

As shown in FIG. 14, the flush valve improvements may also include o-ring seals 186 between the waste and the bearing 188. This improvement provides sealed bearings. A shaft gear 190 is also supported on both sides (double shear), as opposed to other gear trains, which have support on only one side. This improved gear support helps ensure improved flush functionality. Embodiments may also feature environmentally sealed box 192 for the motor and electronics. A further feature may be a vented cavity to prevent waste ingress into the box 192. The motor used may be a brushless DC motor 194, which helps improve reliability, efficiency and position control.

Changes and modifications, additions and deletions may be made to the structures and methods recited above and shown in the drawings without departing from the scope or spirit of the invention and the following claims.

What is claimed is:

1. A valve system for use on-board a passenger transport vehicle, the valve system comprising:
   (a) a toilet frame configured to support a toilet bowl and a flush valve,
   (b) a flush valve body configured to be fluidly connected to a waste outlet of the toilet bowl via a connection feature, the flush valve body having a vacuum waste system connection arm and a toilet bowl outlet connection arm; the toilet bowl outlet connection arm shaped to cooperate with the waste outlet of the toilet bowl and having at least one portion of the connection feature; the waste outlet of the toilet bowl having at least a second portion of the connection feature, wherein the connection feature allows removal of the flush valve body from the waste outlet of the toilet bowl without removal of the toilet bowl or the toilet frame;
   (c) a removable rinse ring comprising a lower outlet valve attachment;
   (d) a rinse valve configured to be fluidly connected and directly coupled to the removable rinse ring via the lower outlet valve attachment of the rinse ring,
   (e) wherein the toilet frame further comprises a bracket, wherein retention of the rinse ring on the toilet frame sandwiches the rinse valve between the rinse ring and the bracket.

2. The system of claim 1, wherein the connection feature comprises an actuation handle and a securement pin.

3. The system of claim 2, wherein the actuation handle is positioned near the waste outlet of the toilet bowl, wherein the securement pin is positioned on the toilet bowl outlet connection arm, and wherein movement of the actuation handle with respect to the securement pin maintains fluid connection between waste outlet and the toilet bowl outlet connection arm.

4. The system of claim 1, wherein the toilet frame comprises a toilet bowl receiving portion, a base portion, and a flush valve body receiving opening.

5. The system of claim 4, wherein the toilet bowl comprises a removable toilet bowl, positionable within the toilet bowl receiving portion such that the waste outlet is accessible through the flush valve body receiving opening.

6. The system of claim 1, wherein the toilet bowl outlet connection arm of the flush valve body is connectable to the toilet bowl outlet via the connection feature.

7. The system of claim 1, wherein the connection feature further comprises a seal configured to be compressed.

8. The system of claim 7, wherein the seal is positioned between the toilet bowl waste outlet and the toilet bowl connection arm.

9. The system of claim 1, wherein this rinse ring further comprises an upper stem that supports an anti-siphon valve.

\* \* \* \* \*